United States Patent [19]

Östman

[11] Patent Number: 5,044,913
[45] Date of Patent: Sep. 3, 1991

[54] DEVICE AT MULTI PLATEN PRESSES

[75] Inventor: Carl-Olof Östman, Kajutgatan, Sweden

[73] Assignee: Swanboard Masonite AB, Sweden

[21] Appl. No.: 346,176

[22] PCT Filed: Oct. 6, 1986

[86] PCT No.: PCT/SE86/00449

§ 371 Date: Apr. 6, 1989

§ 102(e) Date: Apr. 6, 1989

[87] PCT Pub. No.: WO88/02301

PCT Pub. Date: Apr. 7, 1988

[51] Int. Cl.$^5$ .................. B29C 43/58; B29C 15/28
[52] U.S. Cl. ........................... 425/135; 100/45; 100/53; 100/99; 100/194; 414/274; 414/275; 425/136; 425/137; 425/145; 425/154; 425/169; 425/338
[58] Field of Search .............. 425/136, 137, 145, 154, 425/169, 338, 135, 406; 100/43, 45, 48, 53, 99, 194; 198/718; 414/273-275

[56] References Cited

U.S. PATENT DOCUMENTS

| Re. 27,223 | 11/1971 | Nelson | 425/338 |
|---|---|---|---|
| 2,704,608 | 3/1955 | Graf et al. | 425/338 |
| 2,878,728 | 3/1959 | Clark | 425/338 |
| 3,541,640 | 11/1970 | Stefaniak et al. | 425/136 |
| 3,859,019 | 1/1975 | Wight | 425/154 |
| 4,134,334 | 1/1979 | Johnson | 100/48 |
| 4,200,428 | 4/1980 | Andrews | 425/136 |

FOREIGN PATENT DOCUMENTS

| 697298 | 11/1964 | Canada | 425/137 |
|---|---|---|---|
| 78183 | 12/1970 | German Democratic Rep. | 425/136 |
| 46-1873 | 1/1971 | Japan | 425/137 |

Primary Examiner—Jay H. Woo
Assistant Examiner—James P. Mackey
Attorney, Agent, or Firm—Ostrolenk, Faber, Gerb & Soffen

[57] ABSTRACT

A loading elevator for a multi-platen press is provided with a pusher which simultaneously transfers a number of transport plates loaded with stampings to the press. After press operations are completed, the plates are unloaded by an extractor to an unloading elevator. The pushing and the unloading of the plates are automatic, with sensors provided to halt the loading and unloading in the event of excessive resistance to the movement of any one of the plates. A plurality of sensors are provided in the pusher and in the extractor, one sensor there for each of the plates. Each sensor is connected to halt the operation on recognition by the sensor that an express resistance exists and if desired to provide a signal that the halting has taken place. At the unloading elevator, a sliding contact at each of the plates senses that the plate has been moved to the unloading elevator, and the sliding contact is separated from the plate by the stamping carried on the plate, which senses thereby that the plate and the stamping upon it have both been transported to the unloading elevator.

14 Claims, 2 Drawing Sheets

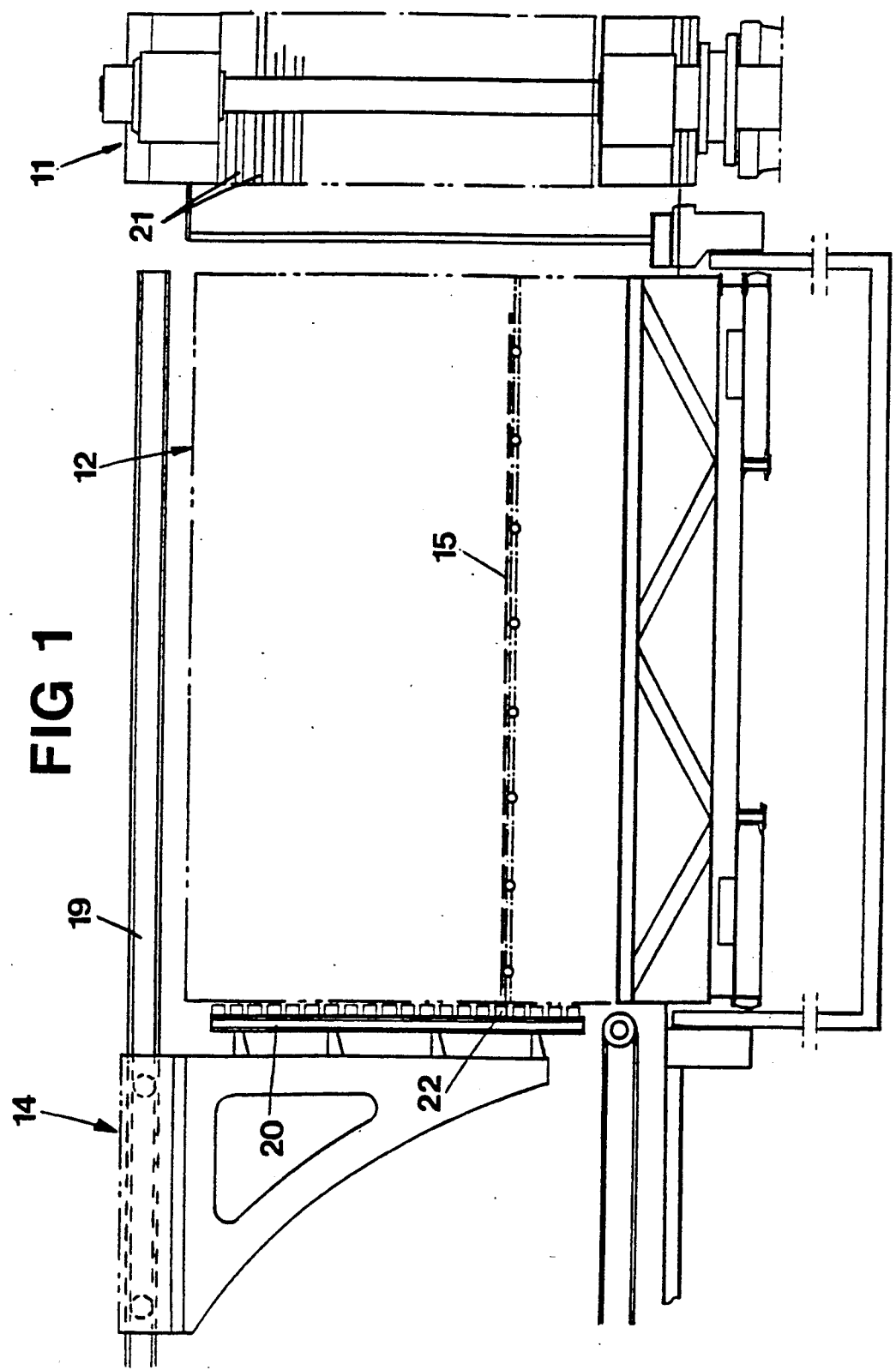

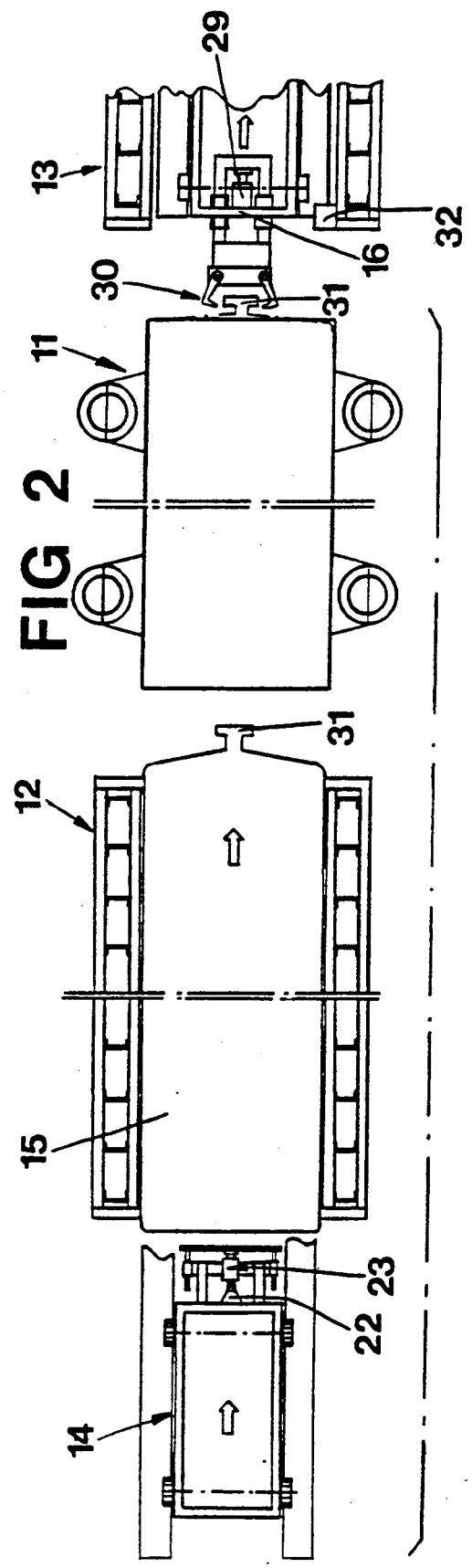
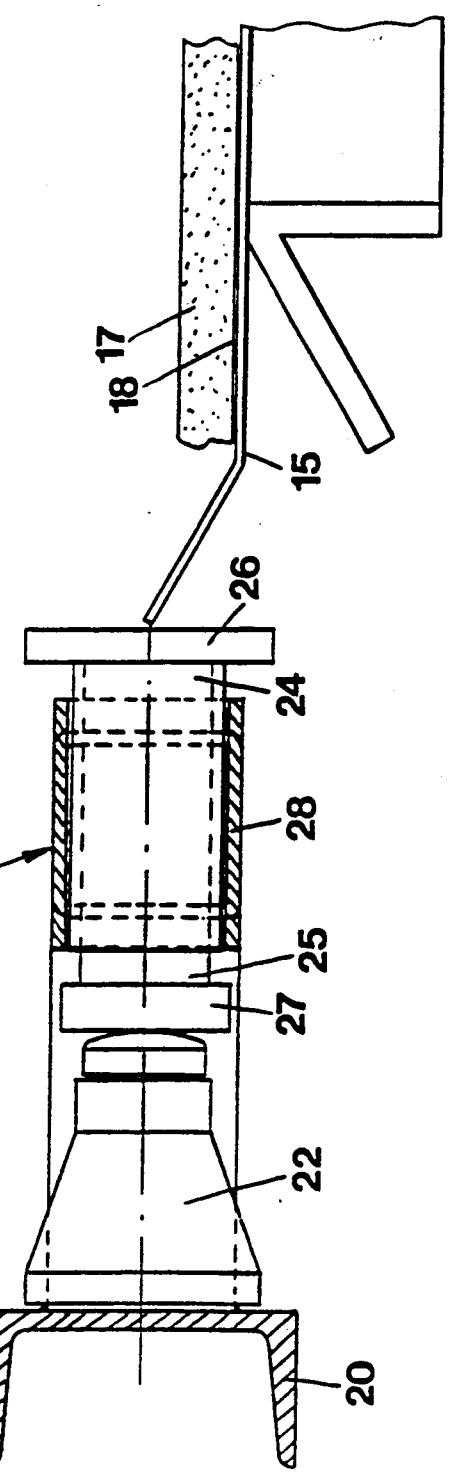

DEVICE AT MULTI PLATEN PRESSES

The present invention refers to a device at multi platen presses of the type in which a number of transport plates carrying stampings by means of a pusher are transferred simultaneously from a loading elevator to the press, and which after a stamping operation by means of an extractor are transferred therefrom to an unloading elevator, whereby the device incorporates means, which at occurance of an abnormal resistance during the transfer of the transport plates interrupt the movement of the pusher.

BACKGROUND OF THE INVENTION

At production of wallboard, particle board and the like, the wood fibres and the wooden chips resp. are shaped under high pressure and elevated temperature in a press, in which a number of boards commonly are pressed at the same time. The loading of those multi platen presses is effected by means of a loading elevator, which is so designed that the entire package of transport plates, upon which the stampings are situated, are displaced by the pusher into the press. This consists of a number of pressing plates, which are displaceable vertically in relation to each other and which at loading of the press are opened so much that the transport plates can be well inserted between the pressing plates.

Hitherto it has been difficult to automatize the loading of the press, as the risk of breakdowns could not be excluded. The reason for breakdown can be e.g. that the loading elevator due to an incorrect level indication has a wrong level relative to the levels of the press, thus that when the transport plates are pushed in, one or more of them will not find an opening between the pressing plates and become deformed, both at contact against the press and against the pusher. Such a breakdown means a stoppage of several hours. Another reason causing breakdown is that one or more transport plates has any type of deformity, thus that the plate, when pushed in, will catch and is cocked, which if it happens outside the press also can influence adjacent transport plates in the elevator. If the breakdown takes place inside the press it is possible that the pressing plates are damaged. Another reason can be that the sieve on the transport plate comes loose from the transport plate and at the insertion is rolled up together with the stamping, whereby one or more heating plates are deformed.

Also at the extraction of the transport plates from the press by means of the extractor to the unloading elevator it is possible that breakdowns may occur. The pulling member at the transport plate can e.g. be deformed thus that the extractor will not seize it whereby the transport plate will remain in the press. It may also occur that the transport plate certainly is withdrawn from the press at the unloading, but that the stamping has got stuck on the underside of the press plate and will not follow the transport plate out of the press.

THE PURPOSE AND MOST ESSENTIAL FEATURES OF THE INVENTION

The purpose of the present invention is to prevent breakdowns of the abovementioned type without manual supervision. Another purpose of the invention is to make possible that the pushing in and extraction of the transport plates can be carried out fully automatically with simple but reliable means, which immediately shall stop a pushing in or unloading even if the separate plate only is slighted deformed. These objects have been solved therein that the pusher and/or the extractor are provided with said means, shaped as sensors of a number at least corresponding to the number of transport plates, which sensors are arranged to sense every separate transport plate regarding its pushing-in and withdrawl resistance respectively, and that each sensor is arranged to activate an alarm device and/or a stop device, which stops the continued movement of the pusher or the extractor respectively when a certain force maximum is exceeded.

BRIEF DESCRIPTION OF THE DRAWINGS

FIG. 1 shows a side view, partly in section, of a multi platen press with an loading elevator, provided with the device according to the invention, FIG. 2 shows in smaller scale a view from above of the press, the loading and unloading elevators and a pusher and extractor serving these elevators, FIG. 3 shows in bigger scale a side view partly in section of the sensor of the pusher.

DESCRIPTION OF EMBODIMENT

In FIG. 2 is shown a conventional wet press 11 at one side of which is connected a loading elevator 12 and at the other side of which an unloading elevator 13, which elevators are both U-shaped in cross-section and designed thus that a pusher 14, which is movable along horizontal guides above the loading elevator, can push out all transport plates 15 situated on different loading elevator levels into the press 11, whereas on the unloading side a corresponding extractor can pull out the plates 15 from the press and into the unloading elevator 13. The loading and unloading elevators are inside the shanks of the U provided with shelf planes, on which the transport plates 15 with the stampings 17 are placed. If the stamping e.g. is a wet sheet at production of wallboards, then at the transfer of the wet sheet 17 to the transport plate 15, the sieve 18 will also be located on the transport plate.

The pusher 14, which is displaceable in the horizontal plane along guides 19, is equipped with at least one vertical beam 20, which at conventional plants transfers the pushing force of the pusher 14 directly to the transport plate 15. In order to prevent breakdowns when pushing in the transport plates 15 into the press 11 between the opened platens 21, the vertical beam 20 is provided with a pressure sensor 22 just in front of a transport plate 15, which during the time a plate is pushed in senses the resistance presented by a plate at the pushing-in operation. If the plate should get stuck anywhere on the way or should a resistance increase occur in any other way, the sensor immediately will initiate an alarm and/or stop the continued movement of the pusher when a preset threshold value is exceeded.

In order to be able to adjust the sensor 22 in relation to the pusher and in relation to the loading elevator 12, a cushion 23 is arranged in front of each sensor 22, which cushion consists of two sleeves 24 and 25, which can be screwed into each other and which are provided with an end plate 26 and 27 each, said sleeves being displaceable in a guide 28 attached to the beam 20. By screwing the sleeves 24, 25 in relation to each other it is possible to adjust the positions of the cushions 23.

On the opposite side of the press 11 the extractor 16 can be equipped with similar sensors 29, which via a yoke is actuatable by gripping claws 30 of a number corresponding to the number of transport plates 15, which gripping claws are displaceably supported at the extractor 16 and arranged to grip a hook 31 on the corresponding transport plate 15. Also in this case the sensor 29 releases an alarm and/or causes the extractor to stop immediately, at a pressure increase caused by the transport plate and giving a bigger resistance than the preset threshold value.

As it can occur that the stamping gets stuck in the press against the lower side of a pressure plate 21 there is arranged sensors 32 also on the unloading elevator 13, which sensors e.g. can be a sliding contact, which senses if the stamping 17 remains on the transport plate 15 or not. The sliding contact can be fed with a low tension current, e.g. 24 V, whereby the transport plate via the press as mass (earth) is connected in a current circuit. When the transport plate hits the sliding contact it is indicated that all plates are withdrawn. Contact is not obtained if any plate should remain in the press and alarm and/or an immediate stop of the extractor is released. After the initial withdrawl of the transport plate from the press, whereby the current circuit is closed, in that the sliding contact engages the transport plate, the current circuit is interrupted in that the stamping 17 lifts the sliding contact from the transport plate or breaks the current. If this does not happen an alarm is released and/or the continued movement of the extractor is stopped, at the same time as a display (not shown) indicates which transport plate it concerns. Instead of electric sensing it is also possible to use a microswitch as sensor, which interrupts a current circuit, when the switch indicates a level difference as the stamping passes by the switch.

The invention is not limited to the embodiment described and shown but a plurality of variations are possible within the scope of the claims.

I claim:

1. A device at a multi platen press for transferring transport plates, wherein the transport plates are for carrying stampings thereon through the press, and the press includes a loading elevator for the plates, a press on which each plate is stamped, and an unloading elevator from the press; and wherein the device is for transferring plates from the loading elevator to the press and from the press to the unloading elevator and wherein the press is disposed in the path of transfer between the loading and unloading elevators;

the device comprising:
a pusher at the loading elevator for simultaneously pushing a plurality of the plates onto the press;
an extractor at the unloading elevator for simultaneously removing a plurality of the plates from the press;
at least one of the pusher and the extractor inlcuding sensors adapted for individually sensing the resistance to movement of each plate by the respective one of the pusher and the extractor at which the sensor is included, and
each sensor being connected to other means responsive to the sensing of the resistance to movement of the respective plate and the responsive means acting when the sensed resistance is beyond a predetermined level.

2. The device of claim 1, wherein the responsive means comprises an alarm device which is activated by any one of the sensors upon the predetermined level of resistance to movement of the respective one of the plates for the sensor being exceeded.

3. The device of claim 1, wherein the responsive means comprises a stop device connected with at least one of the pusher and the extractor for halting the operation of the respective one of the pusher and the extractor, the stop device being activated by any one of the sensors upon the predetermined level of resistance to movement of the respective one of the plates for the one sensor being exceeded.

4. The device of claim 3, wherein there is a stack of the transport plates and there is a respective sensor in the respective one of the pusher and the extractor for each of the transport plates.

5. The device of claim 3, wherein the stop device is connected with the pusher.

6. The device of claim 5, wherein the sensors are at the pusher.

7. The device of claim 3, wherein the stop device is connected with the extractor.

8. The device of claim 7, wherein the sensors are at the extractor.

9. The device of claim 1, wherein there is a stack of the transport plates and there is a respective sensor in the respective one of the pusher and the extractor for each of the transport plates.

10. The device of claim 1, further comprising a respective plate sensor for each plate at the unloading elevator for sensing if each plate has been extracted from the press to the unloading elevator.

11. The device of claim 10, wherein the plate sensor further comprises means for sensing if a respective stamping has been carried on the plate as the plate transfers to the unloading elevator.

12. The device of claim 11, wherein the means for sensing if a respective stamping has been carried on the plate comprises a respective sliding contact for each plate and located at the unloading elevator, an electric circuit inlcuding the sliding contacts, and the transport plates being adapted to form part of the electric circuit with the sliding contacts, such that each transport plate moving into the unloading elevator engages the sliding contact and completes the electric circuit; and
means at the plate sensor for sensing the presence of a stamping on the plate in the unloading elevator and for opening the electric circuit upon sensing the presence of a stamping.

13. The device of claim 12, wherein the means for sensing the presence of a stamping comprises the sliding contact being so placed that the stamping on the plate engages the sliding contact to separate the sliding contact from the respective transport plate.

14. The device of claim 10, wherein the plate sensor comprises a respective sliding contact for each plate and located at the unloading elevator, an electric circuit including the sliding contacts, and the transport plates being adapted to form part of the electric circuit with the sliding contacts, such that each transport plate moving into the unloading elevator engages the sliding contact and completes the electric circuit.

* * * * *